US012623534B2

(12) United States Patent
Leach

(10) Patent No.: US 12,623,534 B2
(45) Date of Patent: May 12, 2026

(54) DAMPER SYSTEM FOR CONTROLLED ENGAGEMENT OF A TORQUE TRANSFER MECHANISM

(71) Applicant: Garrett Patrick Leach, Midland City, AL (US)

(72) Inventor: Garrett Patrick Leach, Midland City, AL (US)

( * ) Notice: Subject to any disclaimer, the term of this patent is extended or adjusted under 35 U.S.C. 154(b) by 0 days.

(21) Appl. No.: 19/041,558

(22) Filed: Jan. 30, 2025

(65) Prior Publication Data

US 2025/0242690 A1      Jul. 31, 2025

Related U.S. Application Data

(60) Provisional application No. 63/626,766, filed on Jan. 30, 2024.

(51) Int. Cl.
B60K 20/04      (2006.01)
G05G 5/05      (2006.01)

(52) U.S. Cl.
CPC .............. B60K 20/04 (2013.01); G05G 5/05 (2013.01); *G05G 2505/00* (2013.01)

(58) Field of Classification Search
CPC ........ G05G 1/30; G05G 2505/00; G05G 5/05; B60K 20/04
USPC ....................................................... 74/473.16
See application file for complete search history.

(56) References Cited

U.S. PATENT DOCUMENTS

| | | | |
|---|---|---|---|
| 3,645,042 A | 2/1972 | Bolli | |
| 4,796,739 A | 1/1989 | Jonner et al. | |
| 6,367,886 B1 * | 4/2002 | Shaw ................... | B60T 8/4086 |
| | | | 303/50 |
| 8,175,785 B2 | 5/2012 | Turski et al. | |
| 8,418,828 B2 * | 4/2013 | Bartnick ................. | G05G 1/30 |
| | | | 74/519 |
| 9,121,217 B1 | 9/2015 | Hoffberg | |
| 10,047,845 B2 | 8/2018 | Depraete | |
| 11,285,062 B2 | 3/2022 | Wu | |
| 11,378,139 B2 | 7/2022 | Grethel et al. | |

FOREIGN PATENT DOCUMENTS

EP      1562097 A2 *      8/2005      .............. G05G 1/30

* cited by examiner

*Primary Examiner* — Randell J Krug
(74) *Attorney, Agent, or Firm* — Hall Estill Law Firm

(57) ABSTRACT

Apparatus and method for selectively controlling the response characteristics of a torque transfer mechanism such as an automobile clutch. A damper has an outer housing and an extendable piston rod connected between a linear bearing cartridge and a clutch arm. A retention pin is selectively extended to hold the bearing cartridge while the rod is extended as the clutch arm is moved from an engaged position to a disengaged position. Upon release of the clutch arm, the pin is retracted and the damper applies a damping force upon the clutch arm as the rod is retracted into the housing. The system is particularly suited for engagement of first gear in a drag racing car to provide optimum initial acceleration of the car.

20 Claims, 4 Drawing Sheets

DAMPER SYSTEM FOR CONTROLLED ENGAGEMENT OF A TORQUE TRANSFER MECHANISM

RELATED APPLICATIONS

The present application makes a claim of domestic priority under 35 U.S.C. 119(e) to U.S. Provisional Patent Application No. 63/626,766 filed Jan. 30, 2024, the contents of which are hereby incorporated by reference.

SUMMARY

Various embodiments of the present disclosure are generally directed to a method and apparatus for controllably engaging a torque transfer element to transfer power/torque from an engine to a drivetrain, such as but not limited to a clutch mechanism in an automotive vehicle having an internal combustion engine (ICE) and a manual transmission.

Without limitation, some embodiments provide a damper system apparatus having a damper, a rail system and a retention pin. The damper has an outer housing and a piston rod. The piston rod is configured to be extended from the outer housing and retracted into the outer housing in opposition to a damping force. The rail system includes a stationary track along which a moveable bearing block is configured to rollably advance and retract. The bearing block is mechanically coupled to a first end of the damper, and a second end of the damper is configured to be coupled to a torque transfer element. The retention pin is selectively extendable to secure the bearing block to the track in a fixed position.

The securement of the bearing block to the track by the pin allows the piston rod to be extended from the outer housing responsive to transition, by a user, of the torque transfer element between an engaged position to a disengaged position. The extended pin remains in mechanical engagement, via a friction interface, with the bearing block while the torque transfer element remains in the disengaged position. The retention pin is further configured to be retracted, via a pin biasing force, responsive to release by the user of the torque transfer element. As the torque transfer element advances, the piston rod is retracted into the housing. In this way, the damper controls a rate at which the torque transfer element returns to the engaged position.

Further embodiments are generally directed to a method of using the foregoing apparatus, including steps of extending the retention pin to secure the bearing block to the track in the fixed position; transitioning, by a user, the torque transfer element from the engaged position to the disengaged position to extend the piston rod from the outer housing; and releasing, by the user, the torque transfer element from the disengaged position, thereby facilitating retraction of the retention pin by the pin biasing force responsive to release of the friction interface and retraction of the piston rod into the outer cylinder by transition of the torque transfer element to the engaged position.

These and other features and advantages of various embodiments can be understood from a review of the following detailed description in conjunction with a review of the accompanying drawings.

DETAILED DESCRIPTION

Figures 1, 2A, 2B, 3A, 3B:
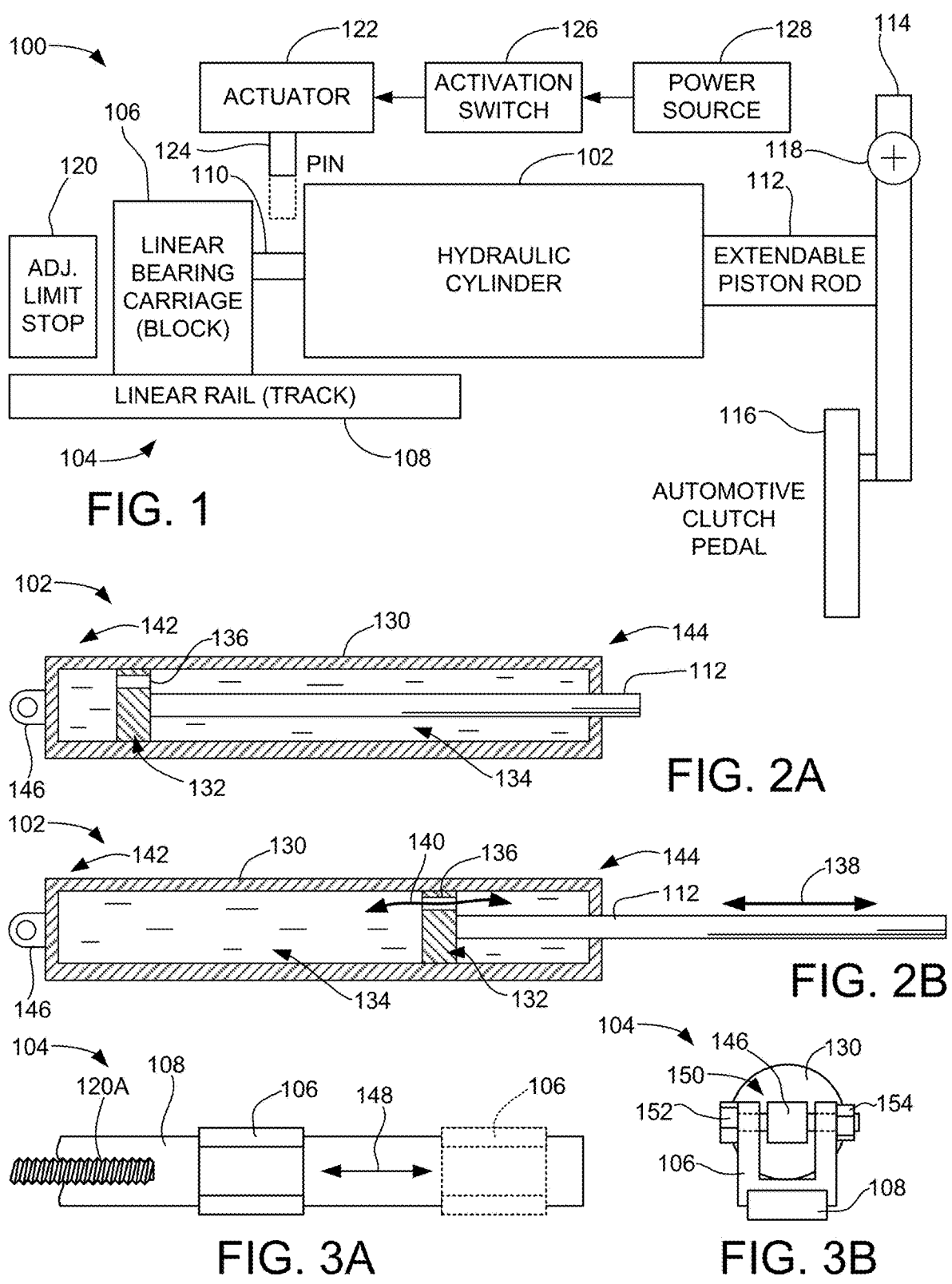
FIG. 1 is a functional block diagram of clutch pedal damper system constructed and operated in accordance with various embodiments of the present disclosure.
FIG. 2A is a simplified cross-sectional representation of a hydraulic damper of the system of FIG. 1 in some embodiments, with the hydraulic damper being in a retracted (normal) state.
FIG. 2B is a corresponding representation of the hydraulic damper of FIG. 2A in an extended state.
FIGS. 3A and 3B show respective top plan and end views of a linear rail system of the system of FIG. 1 in further embodiments.

Various embodiments of the present disclosure are directed to systems and methods for selectively controlling the response characteristics of a torque transfer mechanism used to transfer power/torque to a drive train.

The various embodiments are described as being operative in the environment of an automotive clutch for an automobile or other vehicle with an internal combustion engine (ICE) and a manual transmission activated by a shifter handle (stick shift) selectable gear box, although other application environments can be used. The system is sometimes referred to herein as a torque transfer or clutch pedal damper system.

It is contemplated, albeit not necessarily required, that the system is particularly suitable for drag racing type events where a race car is driven by a human driver along a straight line track. In such events, the goal is to accelerate from a dead stop and cover a predetermined linear distance in as short an elapsed time as possible. Typical race distances may be a quarter-mile (e.g., 1320 feet or about 400 meters), an eighth-mile (e.g., 660 feet or about 200 m), or some other distance.

To this end, in at least some embodiments the clutch pedal damper system provides controlled damped engagement of the clutch at the beginning of the acceleration run while the transmission is in its lowest (first) gear, when torque first begins to be transferred to the drivetrain. Subsequent gear shifts by the driver to higher gears (second, third, fourth, etc.) are carried out using the native clutch response characteristics of the vehicle; that is, the damper system is normally only used during first gear and is disengaged during selection of each subsequent gear.

In at least some embodiments, the main elements in the clutch pedal damper system include a damper, a bearing system, an actuator, and an optional adjustable stop mechanism. Other arrangements can be used.

The damper can take the form of a hydraulic cylinder, such as but not limited to the type of damper used as a screen door reclosure mechanism, a shock absorber, etc. The damper has a cylindrical housing and an extendable/retractable piston rod. While a hydraulic damper is envisioned as a particularly suitable mechanism due to repeatability in view of changes in environmental conditions (e.g., temperature, vibration, etc.), the inventive subject matter is not so limited. Rather, substantially any type of reclosable mechanism/cylinder can be used, including but not limited to a gas based (pneumatic) cylinder, a spring based retraction mechanism, etc.

It is generally envisioned that the damper will operate between two positions: a normally retracted position and a temporarily extended position. In the normally retracted position, the piston rod is fully pressed into the cylinder and the damper has the shortest overall length. In the extended position, the piston rod is partially or fully extended from the end of the cylinder and the damper has a longer (or longest) overall length. An application of force to the end of the piston rod moves an internal piston within the cylinder, causing fluid within the cylinder to flow through aperture(s) in the piston at a controlled rate. The greater the force, the faster the movement of the piston rod.

The damping response will largely remain linear over the length of the piston rod, although such is not required. The damper may incorporate one or more biasing elements, such as a spring, that tends to urge the damper to the retracted or extended positions, or may be a passive damper that only generates reactive forces to resist movement of the piston rod relative to the cylinder housing.

The bearing system includes a rail (track) and a bearing block that can normally freely advance along the rail. A linear track and a linear bearing cartridge block arrangement is suitable, but other forms can be used. One end of the damper is affixed to the bearing block. The other end of the damper is attached to a clutch arm of the vehicle or other torque transfer element.

As used herein, the clutch arm, also referred to as the pedal arm, is a mechanically depressible lever or bracket that supports a clutch pedal. The clutch pedal, in turn, is depressed by a foot of the user (driver) to engage and disengage a power source (such as an ICE) from a power train (such as a manual transmission) to transfer torque and power from the power source to the power train. A clutch biasing mechanism, such as a clutch spring, normally urges the clutch pedal to the engaged mechanism.

The rail, bearing block and damper are arranged such that, normally, the hydraulic damper is in the retracted state while the bearing block freely travels forward and backwards along the rail. Thus, under normal operation, the user can engage (depress) and disengage (release) the clutch pedal during normal driving and the system has essentially no effect on the response of the system. Articulating linkages are provided at one or both ends of the damper to allow different angles of the damper during engagement and release of the clutch while the rail remains stationary in an existing planar orientation.

The damper has a cylinder end and a piston rod end. In the various illustrated embodiments discussed below, the cylinder end is affixed to the bearing block and the piston rod is affixed to the clutch arm. However, the damper can be reversed so that the piston rod end is affixed to the bearing block and the cylinder end is affixed to the moveable element. Other damper arrangements can be similarly oriented either way.

In further embodiments, the actuator includes a solenoid activated plunger, a user activated switch, and a source of electrical power. When the user presses the switch, current is applied to the solenoid and the actuator pin is thrust forward into an interference condition with the bearing block. This temporarily places the bearing block in a locked position with respect to the rail, so that, in the locked position, the bearing block is prevented from freely rolling along the rail.

The use of a remote switch is desirable since a driver wearing a five-point harness may not be able to physically reach forward and engage the pin. However, this is not necessarily required as other user switch configurations can be used, including a manually activated pin that the user depresses directly and is activated/deactivated without the use of electrical power. In other embodiments, an electrically powered, wireless switch can be activated remotely using wireless communication signals, and so on.

As noted previously, when the pin is extended, the distal end of the pin mechanically interferes with or otherwise engages the bearing block using a friction interface. This temporarily prevents movement of the bearing block along the track. Once the pin is in place, the user depresses the clutch pedal with the user's leg/foot. Because one end of the damper is held in place by the pin, the forward advancement of the clutch pedal pulls the piston rod out of the cylinder housing. Once the clutch pedal is fully depressed and maintained in this orientation by the foot of the driver, the driver can release the switch and the pin will tend to remain in place, due to the frictional/mechanical interference between the bearing block and the pin. In this way, the damper is held in tension between the pin and the depressed pedal.

The clutch pedal will have a clutch spring or other biasing member that normally applies a clutch biasing force that urges the clutch pedal forward into the engaged position. The driver overcomes this clutch biasing force to press the clutch forward, and hold the clutch in the disengaged position, with the driver's leg/foot. It will be noted that, when the engagement pin is engaged and the bearing block is locked to the rail, the user will need to additionally overcome the resistive damping force generated by the damper when pressing the clutch forward. However, because the damper force may be significantly less than the clutch biasing force, in many cases the additional force needed by the user to extend the piston rod from the damper housing as the user depresses the clutch pedal may not be noticeable to the user.

So long as the user continues to maintain the clutch pedal pressed fully forward, the damper will remain in the extended position, and the pin will continue to engage the bearing block. At such time that the driver releases the depressed clutch pedal, such as in response to detecting a signal to commence acceleration (e.g., a green light, etc.), the holding force on the pin is released, the pin retracts, and the clutch biasing force will drive the clutch pedal forward in an effort to return the clutch pedal to the normal engaged position.

The clutch biasing force will be opposed by the damping force supplied by the extended damper. Hence, there will be a controllably delayed and damped engagement of the clutch with the engine in relation to the damping characteristics of the damper. The release of the clutch will cause the spring biased pin to retract since there is no longer an interfering force upon the bearing block. Thus, the clutch will return to its normal position as quickly as it can compress the damper and return the plunger to the original retracted position.

In at least some cases, it is contemplated that the return movement of the clutch pedal forward will advance both the damper and the bearing block along the track until the bearing block reaches a limit stop surface, after which further movement of the clutch pedal will be damped by the damper as the piston rod is retracted into the housing.

The damping supplied by the damper thus provides a desired clutch engagement profile that nominally provides efficient engagement of the clutch and the engine to promote optimum acceleration off of the starting line for the vehicle. As such, it is contemplated that the driver may choose to withdraw the foot from the clutch pedal partially or entirely to ensure that the engagement of the drivetrain occurs solely from the feathering of the clutch provided by the damper and not any additional action by the foot.

The optional adjustment block can be configured as a threaded bolt or similar limit stop element with a user actuator knob. The bolt is axially aligned with the travel path of the bearing block and establishes an adjustable, upper limit position for the travel of the bearing block when the clutch is released. Other adjustment block configurations can be used.

The response profile of the system can be adjusted in multiple ways. The user can rotate the piston rod relative to the cylinder housing, thereby increasing or decreasing the flow rate on the damper. This adjusts how quickly or how slowly the clutch transitions to an engaged position. The user can further linearly advance or retract the location of the limit stop surface to delay or advance, within the clutch pedal stroke, when the damping response begins as the clutch engages the engine with the transmission. These and other adjustments can be made through empirical methods to match the optimum settings for a particular vehicle.

Because the system is a mechanical linkage, it can effectively work with any type of clutch mechanism, including hydraulic, electronic and/or cable based clutch activation systems. The mechanical connections are made to an appropriate location along the clutch pedal arm and to a suitable fixed position within the interior of the car (e.g., the dash, the floorboard, etc.). Based on the mechanical nature of the system, changes in environmental conditions, such as temperature, will not significantly change or alter performance of the system over multiple runs.

An advantage of the system is that it only operates when the pin is activated and the bearing block is locked to the rail; hence, in a drag race, the pin can be set to provide a damped response during initial engagement of the ICE in first gear, but each successive gear shift will take place with the normal clutch response and action by the driver to feather the engagement of the drivetrain with the foot on the clutch pedal.

Testing has verified that the use of the system during initial engagement and acceleration can significantly reduce the time to react and engage the drive wheels with the underlying road surface, resulting in faster off-the-line acceleration and ultimately, a better race completion time. While the system is particularly suitable for drag racing type vehicles, the system has utility for substantially any torque transfer mechanism that uses a manual transmission or other gearbox type mechanism to engage a power plant/source and transfer power/torque in a controlled manner.

These and other features and advantages can be understood beginning with a review of FIG. 1, which provides a functional block diagram for a clutch pedal damper system 100 in accordance with some embodiments. The system 100 includes a damper 102 and a rail system 104. The damper is shown to include a hydraulic cylinder. The rail system 104 includes a moveable linear bearing carriage 106 (also sometimes referred to as a bearing or carriage block) which travels along a stationary linear rail track 108. A first end of the cylinder 102 is coupled to the carriage 106 via a linkage 110.

An opposing second end of the cylinder 102 has an extendable rod 112 which can be retracted into, and extended out of, the second end of the cylinder 102. A distal end of the rod 112 is mechanically coupled to a clutch arm 114 of a vehicle using a suitable mechanical linkage (not separately shown in FIG. 1). The clutch arm 114 (pedal arm) terminates at a clutch pedal 116 which can be depressed (disengaged) and released (engaged) by the foot of a user (driver). The clutch arm 114 rotates about a pivot point 118 and is spring biased via a clutch arm spring (not separately shown) to return the clutch pedal 116 to the normally engaged position shown in FIG. 1.

An adjustable limit stop mechanism 120 sets a forward range of travel of the bearing block 106 along the linear rail 108. An actuator 122 controllably extends and retracts an engagement pin 124 to mechanically contact and retain the bearing block 106 and the first end of the cylinder 102 at a desired position along the linear rail 108. The actuator 122 operates responsive to a user activated switch 126, which in turn supplies electrical power (e.g., current) from a power source 128. While not limiting, in some embodiments the actuator includes an electrical solenoid which is energized, via user depression of the switch 126, by 12V DC power from the vehicle. Other arrangements can be used.

As noted above, the hydraulic cylinder 102 may be of the type otherwise conventionally used as a screen door type closing mechanism and/or a shock absorber, although such is not limiting. Such mechanisms come in a variety of sizes, with 10.5 inches in length being a particularly suitable size in many applications. Other sizes of cylinders can be used, however, including but not limited to cylinders of about 6.5 inches, etc. While a hydraulic cylinder is contemplated, other forms of cylinders, including pneumatic cylinders, can be alternatively used.

FIGS. 2A and 2B show the hydraulic cylinder 102 from FIG. 1 in respective retracted and extended positions. The cylinder 102 includes a cylindrically shaped outer housing 130 which encloses a laterally moveable plunger (piston) 132 coupled to the extendable rod 112. A volume of hydraulic fluid 134 is enclosed within the housing 130 in respective chambers that are defined on opposing sides of the piston 132. A flow aperture 136 extends through the piston 132 to interconnect these respective chambers. While only a single aperture 136 is shown, multiple apertures or other flow channel arrangements can be used.

Axial movement of the rod 112 relative to the housing 130, as indicated by arrow 138 in FIG. 2B, establishes compression of the fluid 134 and causes the fluid to flow through the aperture 136 at a selected rate in relation to a number of factors including the viscosity of the fluid and the cross-sectional area of the aperture(s) 136. This fluid flow through the aperture 136 is denoted by arrow 140.

Both extension and retraction of the rod 112 are damped at a linear rate in relation to the flow characteristics of the hydraulic fluid. While not separately shown, the piston 132 can further be configured such that axial rotation of the piston rod changes the cross-sectional size of the aperture 136 and hence, the linear damping rate of the cylinder 102. A spring or other secondary damping member can be incorporated into the cylinder as desired, but has been omitted for purposes of clarity.

The cylinder housing 130 is further shown to have opposing first and second ends 142, 144. The first end 142, also referred to as the cylinder end, includes an attachment bushing 146 suitable for interconnection with the moveable bearing block 106. The second end 144, also referred to as the piston end, accommodates sliding movement of the piston rod 112 and attachment to the clutch arm 114 (FIG. 1) via a suitable attachment mechanism (not shown). It will be appreciated that, in an alternative embodiment, the damper can be reversed such that the cylinder end is affixed to the clutch arm and the piston end is affixed to the bearing block.

FIGS. 3A and 3B illustrate aspects of the rail system 104 from FIG. 1. The bearing block 106 rolls along the stationary track 108 along linear direction 148. Any number of arrangements can be utilized, including rails that are non-planar (e.g., curved tracks, etc.). The adjustable limit stop 120 from FIG. 1 can include a threaded shaft 120A, the distal end of which is adjustably advanced and retracted to limit the overall range of travel of the block 106.

As best shown in FIG. 3B, the attachment bushing 146 of the cylinder 102 can be mated to a yoke 150 of the cartridge block 106 via threaded fastener 152 and nut 154. This arrangement corresponds to the linkage 110 in FIG. 1 and allows angular movement of the cylinder 102 relative to the bearing block 106 while maintaining mechanical coupling of the cylinder to the block.

Figures 4A, 4B, 4C:
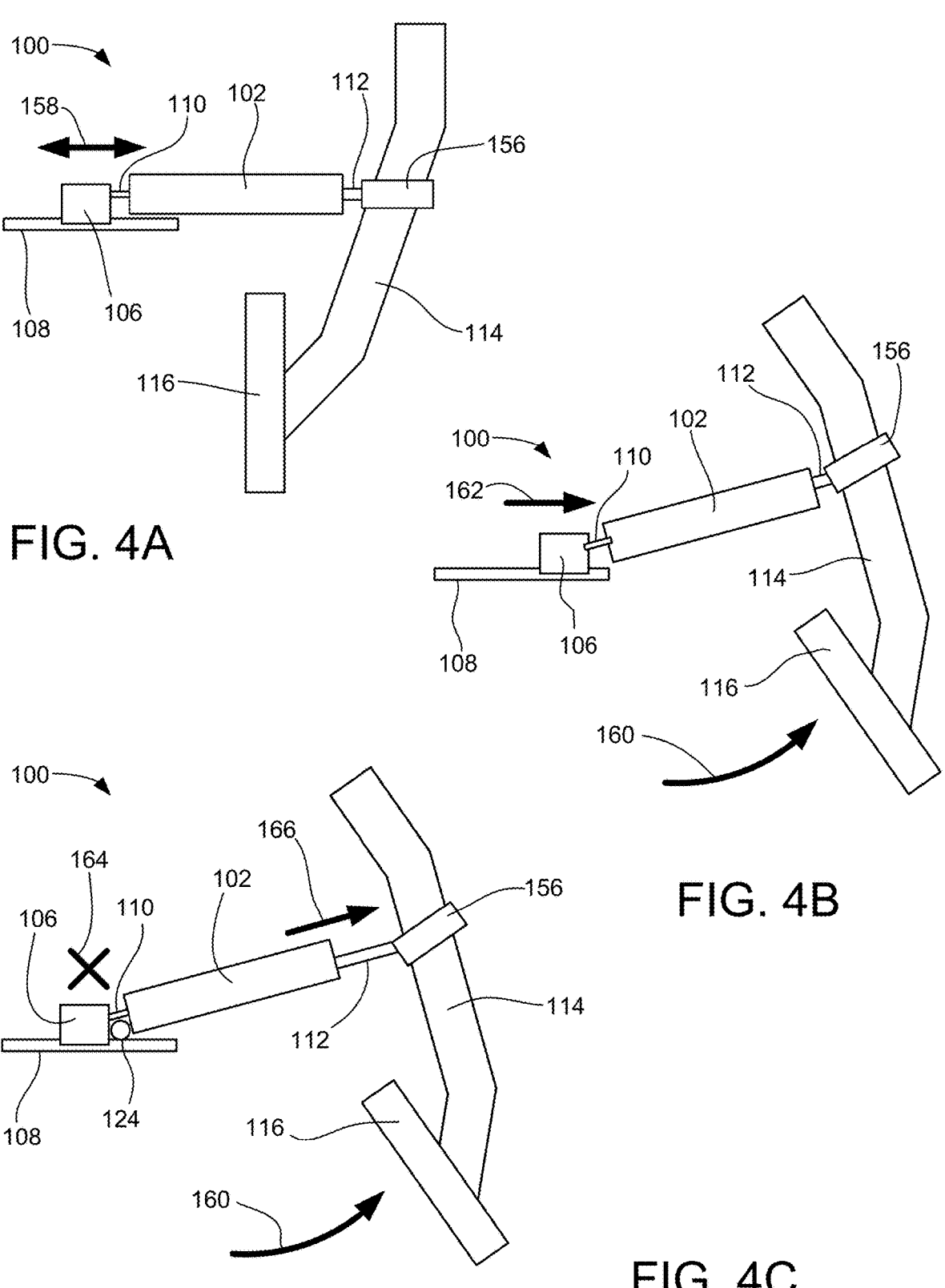
FIG. 4A is a side-elevational schematic representation of the system of FIG. 1 in a clutch engaged condition.
FIG. 4B shows the system of FIG. 4A in a clutch disengaged, non-damped condition.
FIG. 4C shows the system of FIG. 4A in a clutch disengaged, damped condition.

FIGS. 4A through 4C show schematic representations of the system 100 in conjunction with the clutch arm 114 and clutch pedal 116 of FIG. 1. FIG. 4A represents a normal mode of operation in which the clutch pedal 116 is in a released (engaged) state. This state is the normal condition for the vehicle when the vehicle engine is off, when the vehicle transmission is in neutral, or when the clutch is engaged in a selected gear and the vehicle is being driven by the driver at a particular velocity.

FIG. 4A shows relevant aspects of the clutch pedal damper system 100, including the cylinder 102, the bearing block 106 and the stationary rail track 108. The piston rod 112 is in the retracted position and is coupled to the clutch arm 114 using a suitable linkage 156. In this arrangement, the cylinder 102, bearing block 106 and piston rod 112 are free to move forwards and backwards as a unit, as indicated by arrow 158.

FIG. 4B shows the same arrangement as in FIG. 4A, except that the user has now depressed the clutch pedal 116 with the user's foot (not shown) to move the clutch to the disengaged position. This movement of the clutch pedal 116 is along an arcuate path 160 defined by the clutch arm geometry.

As will be recognized, disengaging the clutch (e.g., pushing the clutch pedal to the floor) allows the driver to change gears, move the transmission to neutral, place the vehicle in reverse, etc. As shown by arrow 162, the entire unit (e.g., cylinder 102, block 106 and rod 112) moves forward along the track 108 to accommodate this depression of the clutch pedal 116. The linkages 110 and 156 readily facilitate the change in angle of the system that is induced by depression of the clutch pedal 116 and rotation of the clutch arm 114.

FIG. 4C shows another configuration for the system 100 in further embodiments. In FIG. 4C, the user has depressed the switch 126 (FIG. 1) to extend the pin 124 between the junction of the cylinder 102 and the block 106. As a result, the bearing block 106 is no longer permitted to freely move along the track 108, but is instead captured at the cylinder end, as indicated by an "X" at 164. User depression of the clutch pedal 116 thus operates to extend the piston rod 112 from the cylinder 102, as indicated by arrow 166. As noted above, subsequent release of the clutch pedal 116 by the user will cause the clutch pedal to return to the normal position (FIG. 4A), and this movement will be damped by the retraction of the piston rod 112 into the cylinder 102.

Figure 5A:
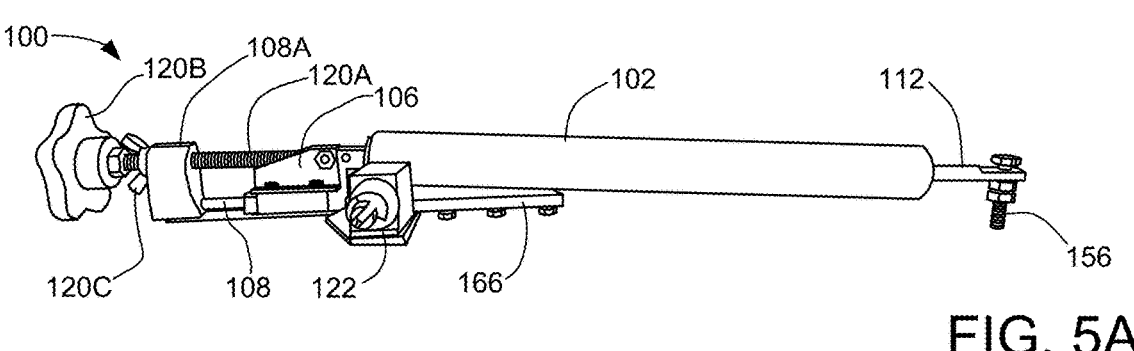
FIGS. 5A, 5B and 5C show illustrations of the system of FIG. 1 in accordance with further embodiments.
Figure 5B:
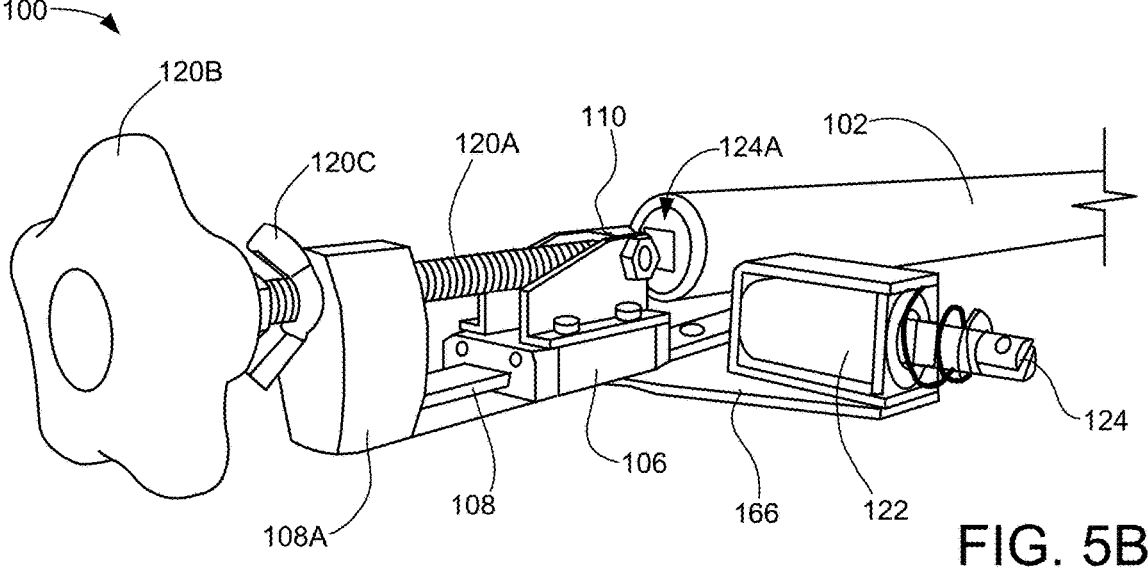
Figure 5C:
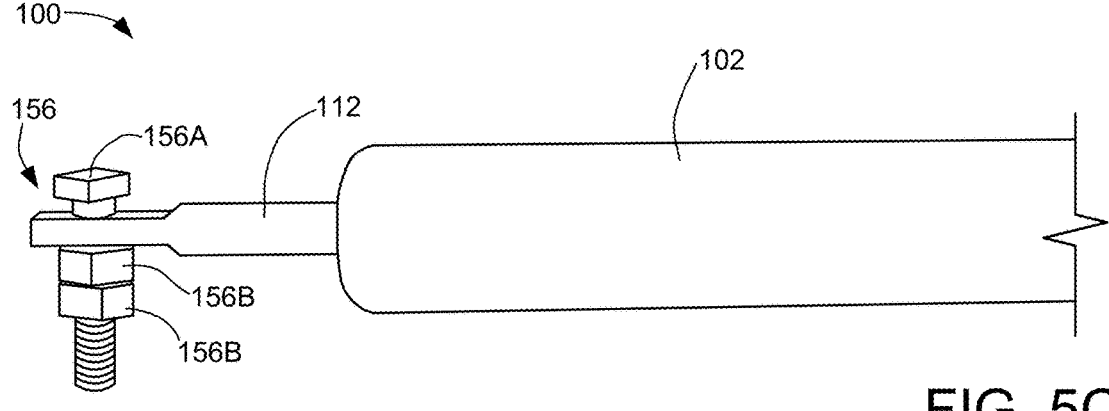

FIGS. 5A through 5C show various views of the clutch pedal damper system 100 in accordance with further embodiments. Other configurations can be used. Various elements discussed above are shown in these drawings, including the hydraulic cylinder 102, carriage block 106, rail track 108, linkage 110, extendable piston rod 112, adjustable limit stop 120 with threaded limit stop shaft 120A, actuator 122, pin 124, and clutch arm linkage 156. Additional elements include user adjustment knob 120B, wing nut 120C, end support 108A, and base support plate 166.

As shown in FIG. 5B, a distal end of the pin 124 extends into a gap 124A between the cylinder 102 and the bearing block 106/linkage 110 to secure the bearing block to the rail track 108. As best shown in FIG. 5C, a threaded bolt 156A and threaded nuts 156B can be used to attach the rod 112 to the clutch arm 114 (FIG. 1), either directly or via an intermediary bracket (156, FIGS. 4A-4C).

Figures 6, 7, 8:
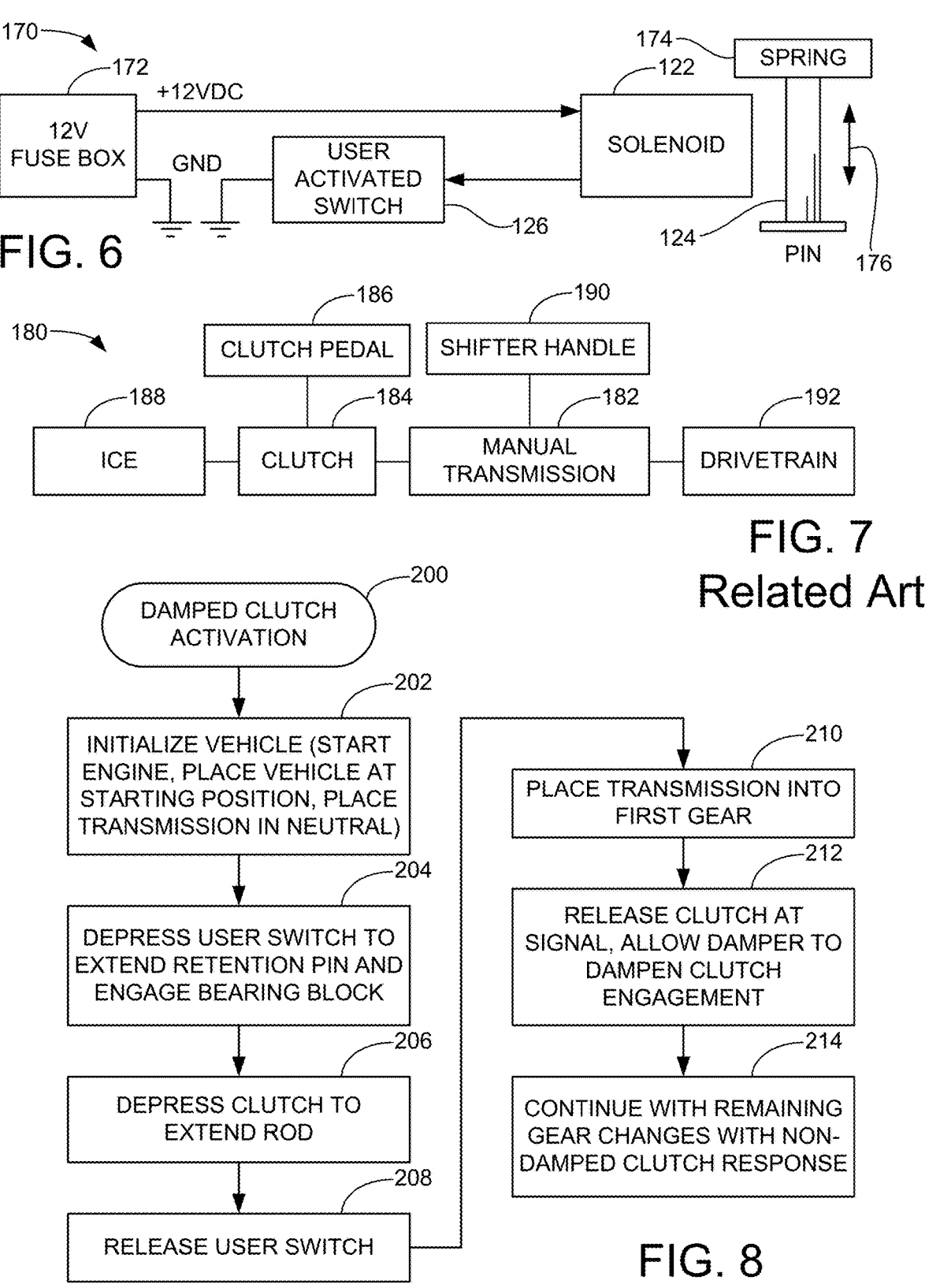
FIG. 6 shows further operation of aspects of the system of FIG. 1 in relation to the retractable pin thereof.
FIG. 7 is a functional block representation of a motor vehicle of the related art in which various embodiments of the present disclosure can be advantageously practiced.
FIG. 8 is a flow chart for a damped clutch activation routine illustrative of steps carried out in accordance with further embodiments.

FIG. 6 is a functional block representation of an electrical control subsystem 170 of the clutch pedal damper system 100 in further embodiments. Other configurations can be used. As noted previously, use of electrical components in the system 100 is particularly useful in some embodiments, but is not necessary. The electrical subsystem 170 includes a 12V fuse box 172 of the vehicle, as well as the previously mentioned actuator (solenoid) 122, pin 124 and switch 126 (see FIG. 1). In this case, the fuse box 172 serves as the power source 128 in FIG. 1, although other power sources can be used (e.g., a separate battery, etc.). A spring 174 is provided to bias the pin 124 in a normally retracted state.

Suitable conductors such as insulated wires are routed from positive (+12VDC) and negative (ground) terminals within the fuse box 172 to the switch 126 and the solenoid 124. Any number of interconnection configurations can be used. In the embodiment shown in FIG. 6, the pressing of the switch 126 by the user completes the circuit of the negative terminals (such as the ground terminal) to the solenoid, thereby passing current through the solenoid, which in turn establishes an electro/magnetic field that retracts the pin 124 as indicated by directional arrow 176.

It will be appreciated that the entire vehicle chassis and frame will generally be electrically ground, so it is not necessary to run two wires from the fuse box. Instead, in one particularly suitable environment, a single 12V conductor is passed from the fuse box (or other source of electrical power from the vehicle's 12V system) to the solenoid. A ground conductor is passed from the solenoid to the switch, and the switch is connected to the chassis. In this way, pressing the switch passes 12V current through the solenoid for actuation as described above.

The switch 126 can be mounted at any suitable location accessible by the driver such as on the dashboard, console, steering wheel, etc. Wireless switches can be utilized as well, including switches that are activatable via a network accessible device (e.g., a smart phone, etc.).

FIG. 7 is a simplified functional block representation of a motor vehicle 180 of the related art to demonstrate a particularly suitable environment for the use of the various embodiments presented herein. As noted previously, the motor vehicle 180 may be any number of different types of vehicles, including a drag racing car of any configuration, a street legal automobile, etc., provided the vehicle has an otherwise conventional manual transmission 182 that is activated by a clutch 184 (torque transfer element) via a driver activated clutch pedal 186.

The clutch 184 can take any number of known configurations, and is of the type that, when engaged, links an internal combustion engine (ICE) 188 to a selected gear of the transmission 182 as determined by activation of a driver shifter handle (stick shift) 190. As is conventional, the gears can include a sequence of forward gears (first through fifth, etc.) each with a successively lower gear ratio to accommodate higher wheel speeds. The transmission 182 can also include a reverse gear and a neutral position that allows the clutch to be released while the ICE 188 is operating and disengaged from the transmission 182.

When engaged, the clutch 184 transfers power and torque from the ICE 188 via the transmission 182 to a drivetrain 192, which in turn may include a rear differential, axle, drive wheels, tires, brakes, etc. As noted above, the clutch pedal damper system 100 controls the engagement of the clutch 184 during initial acceleration in first gear, although the system 100 can be used for other gears as desired. A controller (not separately shown) can be used to selectively engage the pin based on system inputs, such as a detected mode of vehicle operation.

FIG. 8 provides a flow chart for a damped clutch activation routine 200 illustrative of steps carried out in accordance with the foregoing discussion. While not limiting, it will be contemplated that the routine in FIG. 8 is carried out during a drag race using an otherwise substantially stock vehicle (such as a sports car with a manual transmission) having a configuration as generally set forth by FIG. 7.

At this point it will be noted that the system 100 is designed for secure operations in controlled environments such as a race track, and is not normally intended for use during normal driving on public roads. As such, it is contemplated that the driver has driven the vehicle to the race track and has installed the clutch pedal damper system 100 into the vehicle as the driver prepares the vehicle for a drag race.

As can be seen from the foregoing discussion, the system can be quickly and easily installed and removed in a matter of a few minutes. The system 100 can further be set with particular settings (e.g., rotational position of the piston rod 112, advancement of threaded limit stop shaft 120A) and these settings are retained both while the system is installed and after the system has been removed.

The routine 200 commences at step 202 in which the vehicle is initialized. This can include the starting of the engine (188, FIG. 7), placement of the vehicle at the starting line position, placement of the transmission (182) into neutral, etc. The driver also dons the requisite protective clothing and equipment, engages safety harnesses, etc. as is conventional in this type of event.

At step 204, the driver depresses the user switch (126) to extend the retention pin (124) into an interference contacting relation with the bearing block (106) and cylinder (102). This configuration temporarily locks the bearing block to the underlying rail (108).

At step 206, the driver next depresses the clutch pedal (116) to disengage the clutch (184). By this action, the piston rod (112) is extended, as shown by the configuration in FIG. 4C. The user releases the user switch (126) at step 208. The pin (124) remains in the extended position due to mechanical interference and friction between the end of the pin and the cylinder/bearing block.

The driver next places the manual transmission (182) into first gear using the shifter handle (190), as shown by step 210. The driver waits for the signal to commence the race, which may be signaled by a Christmas tree lighting system, the waving of a flag by a referee, etc.

At such point that the driver is signaled to begin, the driver fully releases the clutch (184) at step 212 by removing the driver's foot away from the clutch, allowing the damper (102) to collapse and engage the clutch with the ICE (188) and initiate acceleration of the vehicle. As described above, the release of the clutch allows the pin (124) to retract, the carriage bearing block (106) advances until it strikes the limit stop established by the threaded bolt (120A), and the spring pressure (clutch biasing force) upon the clutch arm (114) drives the piston rod (112) into the cylinder housing (130; see FIGS. 2A-2B). The clutch engages the ICE at a rate established by the damper, providing efficient and controlled acceleration as torque is transferred to the drive wheels.

During the course of the race, it is contemplated that several successive gear changes will be necessary by the driver. As such, step 214 shows the successive engagement of these additional gears during the course of the race. These gear changes are carried out by the driver using the normal clutch response of the vehicle with the cylinder 102 remaining in its fully retracted position, as discussed above in FIGS. 4A-4B. In this way, the bearing block travels freely along the rail and the damper has essentially no effect upon the clutch response during these other gear changes.

Because the system only alters the clutch response when activated, it may be technically possible to otherwise leave the system in place during normal driving (or other use). However, the system should be decoupled and/or removed from the vehicle or other application when not specifically in use, and then installed only under controlled conditions, such as during a race at a specially configured race track, etc. To this end, the linkages used to secure one or both ends of the damper can be configured as quick disconnect linkages, allowing the damper to be disconnected and/or removed when the system is not in use, or the entire system can be quickly removed and installed.

Depending on the configuration of the vehicle, the mounting brackets, rails, switches, etc. may remain in place, provided these elements are positioned in such a way as to not obstruct or interfere with normal vehicle operation upon decoupling or removal of the damper. Any number of clamp, securement clip, or other arrangements will readily occur to the skilled artisan in view of the present disclosure to disable, disengage and/or remove and install the system as required. Other applications are envisioned, however, including integration of the system into a vehicle design where user or controller activated operation of the system is carried out under different driving modes.

It will now be appreciated that the various embodiments disclosed herein provide a number of benefits over the existing art. The system can be selectively used to only be engaged in the selected gear, such as first gear, and does not provide continued damping during subsequently selected gears. This can enhance race performance and reduce wear on the clutch and other elements of the system. While activation is contemplated for first gear and deactivation for remaining gears, other configurations can be used including activation for additional or different gears, etc.

The system provides mechanical linkages, and can therefore be installed for use with substantially any form of vehicle, including transmission/gear shift/clutch mechanisms that are hydraulic, wire activated, electronic, etc. The system can be mounted to the underside of the dash of the vehicle, to the floorboard, or any other suitable location that is out of the way of the driver.

A linear roller system of substantially any type could be used, including one that follows a curved path, so long as the roller system accommodates forward and backwards motion of the clutch arm. While a linear damper is contemplated, other forms of damping could be readily adapted, such as a rotary damper such as the type used to open and close heavy doors.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus, comprising:
   a damper comprising an outer housing and a piston rod configured to be extended from the outer housing and retracted into the outer housing in opposition to a damping force, the damper having opposing first and second ends;
   a rail system comprising a stationary track along which a moveable bearing block is configured to rollably advance and retract, the bearing block mechanically coupled to the first end of the damper, the second end of the damper configured to be coupled to a torque transfer element; and
   a retention pin configured to be selectively extended to secure the bearing block to the track in a fixed position while the piston rod is extended from the outer housing responsive to transition, by a user, of the torque transfer element between an engaged position to a disengaged position, wherein the retention pin is further configured to be maintained in mechanical engagement, via a friction interface, with the bearing block while the torque transfer element remains in the disengaged position, and wherein the retention pin is further configured to be retracted, via a pin biasing force, responsive to release by the user of the torque transfer element, the damper controlling a rate at which the torque transfer element returns to the engaged position.

2. The apparatus of claim 1, wherein the torque transfer element comprises a clutch arm of a motor vehicle that selectively engages and disengages an internal combustion engine (ICE) to and from a drive train responsive to depression of a clutch pedal by the user, wherein the clutch arm is biased by a clutch biasing element toward the engaged position, wherein the apparatus further comprises an attachment mechanism configured to affix the second end of the damper to the clutch arm, and wherein the damping force of the damper modulates the engagement of the ICE with the drive train in a selected gear of the drive train as the clutch arm advances the piston rod into the outer housing.

3. The apparatus of claim 1, wherein the outer housing of the damper is affixed to the bearing block and the piston rod is affixed to the torque transfer element.

4. The apparatus of claim 1, wherein the piston rod is affixed to the bearing block and the piston rod is affixed to the torque transfer element.

5. The apparatus of claim 1, wherein the damper is a hydraulic damper.

6. The apparatus of claim 1, wherein the damper is a pneumatic damper.

7. The apparatus of claim 1, wherein the damper comprises a spring configured to urge the piston rod to a selected one of an extended or a retracted position relative to the outer housing.

8. The apparatus of claim 1, further comprising a limit stop surface to contactingly limit advancement of the bearing block along the stationary track upon release of the retention pin.

9. The apparatus of claim 8, further comprising an adjustment mechanism configured to adjustably advance and retract the limit stop surface relative to the stationary track, the adjustment mechanism comprising a user rotatable knob that uses a threaded shaft to advance and retract the limit stop surface along the stationary track.

10. The apparatus of claim 1, further comprising an actuator configured to extend and retract the retention pin responsive to application and removal of electrical power from a power source.

11. The apparatus of claim 10, further comprising a user activatable switch connected in series between a solenoid of the actuator and a terminal of the power source, wherein upon activation of the user activatable switch the retention pin extends in a forward direction for mechanical engagement with at least a selected one of the bearing block or outer housing.

12. The apparatus of claim 1, wherein the first end of the damper is free to move, via the bearing block, along the stationary track responsive to the retention pin being in the retracted position, and wherein the first end of the damper is fixed relative to the stationary track responsive to the retention pin being in the extended position.

13. A method of using the apparatus of claim 1 comprising steps of:
   using a first attachment mechanism to attach the first end of the damper to the bearing block and a second attachment mechanism to attach the second end of the damper to the torque transfer element;
   extending the retention pin to secure the bearing block to the track in the fixed position;
   transitioning, by a user, the torque transfer element from the engaged position to the disengaged position to extend the piston rod from the outer housing, the retention pin maintaining mechanical engagement, via the friction interface, with the bearing block while the torque transfer element remains in the disengaged position; and
   releasing, by the user, the torque transfer element from the disengaged position, thereby facilitating retraction of the retention pin by the pin biasing force responsive to release of the friction interface and retraction of the piston rod into the outer cylinder by transition of the torque transfer element to the engaged position.

14. A method, comprising:
   securing a damping system to a moveable torque transfer element, the damping system having a damper, a rail system and a retention pin, the damper comprising an outer housing and a piston rod configured to be extended from the outer housing and retracted into the outer housing in opposition to a damping force, the rail system comprising a stationary track along which a moveable bearing block is configured to rollably advance and retract, the bearing block mechanically coupled to a first end of the damper, the torque transfer element mechanically coupled to an opposing second end of the damper;
   extending a retention pin to secure the bearing block to the track in a fixed position;
   transitioning, by a user, the torque transfer element from an engaged position to a disengaged position to extend the piston rod from the outer housing, the retention pin maintaining mechanical engagement, via a friction interface, with the bearing block while the torque transfer element remains in the disengaged position;

releasing, by the user, the torque transfer element from the disengaged position, thereby facilitating retraction of the retention pin by a pin biasing force responsive to release of the friction interface and transition of the torque transfer element to the engaged position at a rate determined by the damping force of the damper as the piston rod is retracted, by the torque transfer element, into the outer cylinder.

15. The method of claim 14, wherein the torque transfer element comprises a clutch arm of a motor vehicle that selectively engages and disengages an internal combustion engine (ICE) to and from a drive train responsive to depression of a clutch pedal by the user, wherein the clutch arm is biased by a clutch biasing element toward the engaged position, and wherein the damping force of the damper modulates the engagement of the ICE with the drive train in a selected gear of the drive train as the clutch arm advances the piston rod into the outer housing.

16. The method of claim 14, wherein the damper comprises at least a selected one of a hydraulic cylinder, a pneumatic cylinder, or a spring.

17. The method of claim 14, wherein during the transition of the torque transfer element between the engaged and disengaged positions the piston rod is extended from the outer housing responsive to the bearing block being secured via the retention pin, and wherein the piston rod is retracted into the outer housing responsive to the bearing block engaging a limit stop surface at a distal end of the track.

18. The method of claim 17, further comprising using an adjustment mechanism to adjustably position the limit stop surface relative to the stationary track, the adjustment mechanism comprising a user rotatable knob that uses a threaded shaft to advance and retract the limit stop surface along the stationary track.

19. The method of claim 14, further comprising using a solenoid to extend the retention pin and a spring to subsequently retract the retention pin.

20. The method of claim 14, further comprising activating a user activatable switch to extend the retention pin.

\* \* \* \* \*